United States Patent [19]

Preston

[11] Patent Number: 4,910,379
[45] Date of Patent: Mar. 20, 1990

[54] MODIFIED MIG WELDING NOZZLE FOR STUD WELDER

[76] Inventor: Gary N. Preston, P.O. Box 582, Okmulgee, Okla. 74447

[21] Appl. No.: 353,244

[22] Filed: May 17, 1989

[51] Int. Cl.⁴ ............................................. B23K 9/20
[52] U.S. Cl. ............................... 219/137 PS; 219/98; 219/99; 219/136; 219/137.2
[58] Field of Search ............ 219/137 PS, 136, 137.2, 219/98, 99

[56] References Cited

U.S. PATENT DOCUMENTS 3,641,305  2/1972  Ritter et al. ........................... 219/99
4,189,978  2/1980  Mauer .................................... 219/98

Primary Examiner—Clifford C. Shaw
Attorney, Agent, or Firm—William S. Dorman

[57] ABSTRACT

A welding apparatus for welding a new stud on to the end of a broken-off stud which comprises a conventional mig welding hose through which inert gas can pass and through which a mig welding wire can be fed, the hose having a conventional extension at one end thereof for attachment of a mig welding nozzle thereto, the extension also having a longitudinally extending contact tip guide attached thereto and through which the welding wire passes, the nozzle having an enlarged cylindrical portion which is received over the extension of the hose, and a reduced cylindrical portion extending over and beyond the contact tip guide in concentric relation thereto. The mig welding hose has a trigger for initiating the flow of inert gas through the hose and into the annular area between the guide and the nozzle, for supplying a d.c. welding voltage and for feeding the wire through the hose and through the contact tip guide. This invention constitutes an improvement wherein the cylindrical portion on the contact tip guide extending from the point of connection of the guide to the hose extension to the other end of the guide is of reduced external diameter as compared to the conventional contact tip guide. An insulating sleeve is received over the reduced external diameter portion of the guide. A new stud having a longitudinal bore extending from a rear end thereof to a location adjacent a forward end thereof where the bore flares outwardly to a larger bore at the forward end of the stud, the stud is received over the insulating sleeve. A shroud having an inner end received on the enlarged portion of the nozzle, has an outer end including a ring which is attached to the inner end of the shroud by means of a plurality of longitudinally extending legs, the length of the shroud being such that the ring extends just beyond the outer end of the stud when the latter is fully received on the guide.

6 Claims, 2 Drawing Sheets

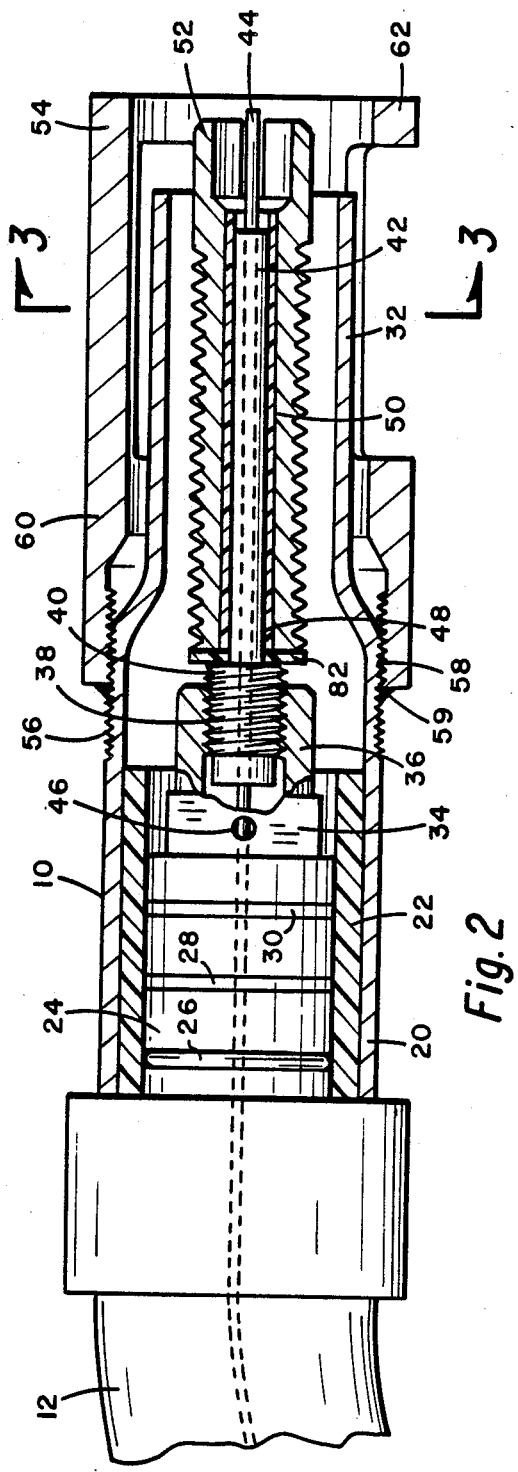
Fig. 2
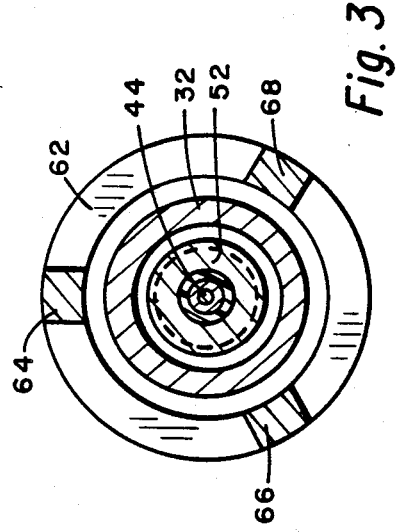
Fig. 3
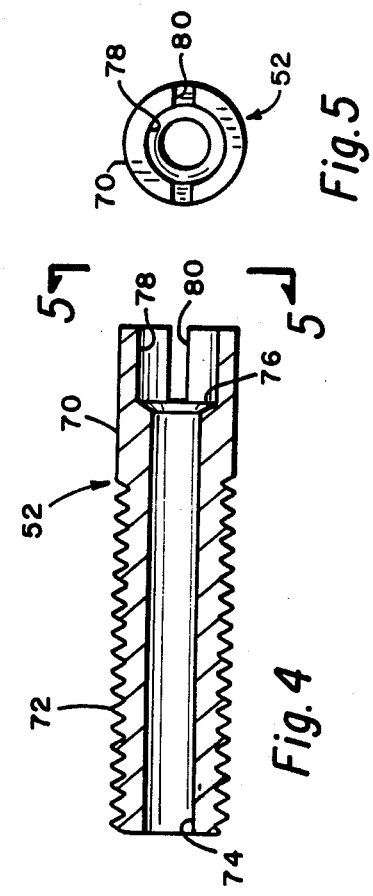
Fig. 5
Fig. 4

MODIFIED MIG WELDING NOZZLE FOR STUD WELDER

BACKGROUND OF THE INVENTION

1. Field of the Invention

The present invention relates to a modified mig welding nozzle. More particularly, the present invention relates to a modified mig welding nozzle which can be used for welding a stud on to the end of a broken-off stud.

2. The Prior Art

The problem which is addressed by the present invention is broadly in the automotive field. More precisely, however, the problem relates to the attachment of an exhaust pipe section to the exhaust manifold of an automobile engine. In this regard, the manifold is normally provided with a circular flange against which the enlarged end of an exhaust pipe section is adapted to fit. A gasket or washer is generally interposed between the enlarged end of the exhaust pipe section and the seat on the flange. A collar is generally received on the exhaust pipe section on the opposite side of the enlarged portion from the manifold flange. Normally, two to four studs which are threaded into the manifold flange extend outwardly from the manifold flange and pass through an equal number of holes in the collar. Threaded nuts are placed on the threaded ends of the studs which project through the collar and are thereafter tightened so as to draw the collar close to the manifold to produce a tight connection between the end of the exhaust pipe and the manifold.

Occasionally, when one is replacing an exhaust pipe section, he will discover that one of the studs has been broken off, generally adjacent the surface of the flange or sometimes even internally within the flange. One of the practices in the past has been to remove the broken stud so as to put a new stud in place. However, this removal generally involves drilling a hole into the broken stud and using an "easy-out" or some other suitable device to remove the broken stud. This method of removing the broken stud is not only difficult, but quite time-consuming. As an alternative to removing the stud, one company (Nickson Industries of Plainville, Conn.) proposes the use of a C-clamp which is placed over the broken stud and becomes a permanent connection between the exhaust pipe and the manifold. However, as one might visualize, continued vibration of the automobile over the roadway will cause the C-clamp to come loose and the repair is compromised.

In my prior co-pending application, Ser. No. 07/251,333, filed Sept. 30, 1988, and entitled "Stud Welding Apparatus and Process" now U.S. Pat. No. 4,871,895, I have disclosed and claimed a stud welding gun which is used to attach a new stud to the end of a broken off stud (as previously described) on the exhaust manifold of an automobile engine. The new stud is supported at one end of the welding gun and a flux coated welding rod is advanced along the gun and through an opening in the center of the stud. The end of the new stud is placed in abutting relation with the end of the broken-off stud and a welding current is initiated as the welding rod is advanced into the area of contact between the two studs. When the welding operation is completed, the welding gun is removed and the new stud is permanently attached to the broken-off stud.

As far as the present invention is concerned, a search was made in the prior art. No references were found which were considered sufficiently pertinent to require any detailed comments. However, the following U.S. Patents were uncovered in the search:

| U.S. Pat. No. | Patentee | Date |
|---|---|---|
| 2,727,123 | G. E. Gregory, Jr. | 12/13/55 |
| 2,984,734 | L. J. Brittaine et al | 5/16/61 |
| 3,940,587 | Oehry | 2/24/76 |
| 4,201,904 | Weidman | 5/06/80 |
| 4,215,809 | Davis | 8/05/80 |
| 4,267,426 | Mallett | 5/12/81 |
| 4,424,434 | Pease et al | 1/03/84 |
| 4,620,079 | Allmann et al | 10/28/86 |
| 4,621,762 | Bronowski | 11/11/86 |

SUMMARY OF THE INVENTION

A modified welding apparatus for welding a new stud onto the end of a broken-off stud which comprises a conventional mig welding hose having a conventional handle attached to the hose with a conventional trigger (a) for initiating the flow of argon or other inert gas through the hose and through the conventional nozzle which is attached to the end of the hose, (b) for actuating an electric current for providing a proper d.c. welding voltage between the conventional mig welding wire and the work piece to be welded and (c) for actuating the device for feeding the mig welding wire through the hose and through the nozzle. The hose is provided with a conventional extension over which the nozzle is attached through an insulating cylinder. The extension is further provided with a contact tip guide which feeds the wire through the center of the nozzle. The nozzle is further provided with a reduced cylindrical portion which extends over the contact tip guide in concentric relation thereto. The argon gas would pass through the annular area between the contact tip guide and the reduced portion of the nozzle.

For the purpose of the present invention, the portion of the contact tip guide which projects beyond its point of connection to the extension on the hose is of reduced diameter as compared to the conventional contact tip guide. An insulating sleeve is received over the reduced portion of the contact tip guide and a new stud which is to be welded to the end of a broken-off stud is received over the insulating sleeve which is on the guide. Means in the form of an insulating washer or a flare on the end of the insulating sleeve will prevent physical contact between the inner end of the stud and the abutting portion of the guide. The inner end of the new stud is threaded whereas the outer end of the stud is preferably unthreaded. The new stud is provided with a longitudinally extending bore of slightly larger diameter than the external diameter of the insulating sleeve. The bore in the new stud flares outwardly approximately mid-way in the unthreaded end to provide a bore of slightly larger diameter. In the area of the larger bore, the stud is provided with a pair of opposite longitudinally extending slots. These slots are to prevent interruption of the arc once welding is initiated and also provide means for egress of gasses.

The outer surface of the enlarged portion of the nozzle, adjacent the location where it tapers downwardly to the reduced portion of the nozzle, is provided with threads. A longitudinally extending shroud is threaded with an opening at the inner end of the shroud and is adapted to be received over the threaded portion on the nozzle. The outer end of the shroud is provided with a ring which connects with the inner end of the shroud by means of a plurality of longitudinally extending legs. The spaces between the legs provide lateral openings in the shroud.

In one form of the invention, the insulating sleeve can be inserted over the reduced portion of the guide with an insulating washer at the inner end to prevent contact between the abutting ends of the stud and the guide. In another form of the invention, the insulating sleeve can be first attached to the stud by inserting the same into the longitudinal bore thereof. The inner end of this sleeve would be outwardly flared or flanged so as to provide a substitute for the insulating washer whose use is then obviated.

If desired, a segment of the ring between any two adjacent legs can be cut out to improve visual alignment of the end of the new stud with the end of the broken-off stud. The ring on the shroud extends slightly beyond the end of the new stud when the latter is fully received on the contact tip guide.

In operation, the stud is first inserted over the reduced extension on the guide with proper insulation being provided between the stud and the guide. The nozzle with shroud attached is now inserted over the extension on the hose. Now the apparatus is brought into position against the broken-off stud so that the end of the new stud is directly over the broken-off end. The trigger on the hose is actuated and a two cycle welding operation commences. At the moment the trigger is depressed, inert gas commences to flow through the hose and into the annular area between the stud and the reduced portion of the nozzle and into the area where the welding is to occur. Immediately thereafter, a d.c. voltage in the range of 15 to 40 volts, preferably about 25 volts d.c. is impressed across the welding wire and the manifold. Simultaneously, with the impression of the welding voltage, the wire feed will commence. During the first cycle, the current will be about 100 to 125 amps and the wire speed will be about 300 inches per minute. The first cycle lasts about 1.5 seconds. At the end of the first cycle, the voltage will drop to about 12 to 16 volts, but the wire speed and current flow will remain essentially the same. After 2.5 seconds, following the initiation of the second cycle, everything will shut off and the nozzle can be pulled away from the new stud which will now be welded to the end of the broken-off stud.

BRIEF DESCRIPTION OF THE DRAWINGS

FIG. 2 is a side elevation, on a slightly enlarged scale, of the right hand portion of FIG. 1 with certain parts being shown in section;

FIG. 3 is a sectional view taken along section line 3—3 of FIG. 2;

FIG. 4 is a longitudinal sectional view of the stud shown in FIG. 2;

FIG. 5 is a right hand end view of the stud shown in FIG. 4, taken along line 5—5; and FIG. 6 is a view similar to FIG. 4 but showing the insulating sleeve inserted in the stud.

DETAILED DESCRIPTION OF THE PREFERRED EMBODIMENTS

Figure 1:
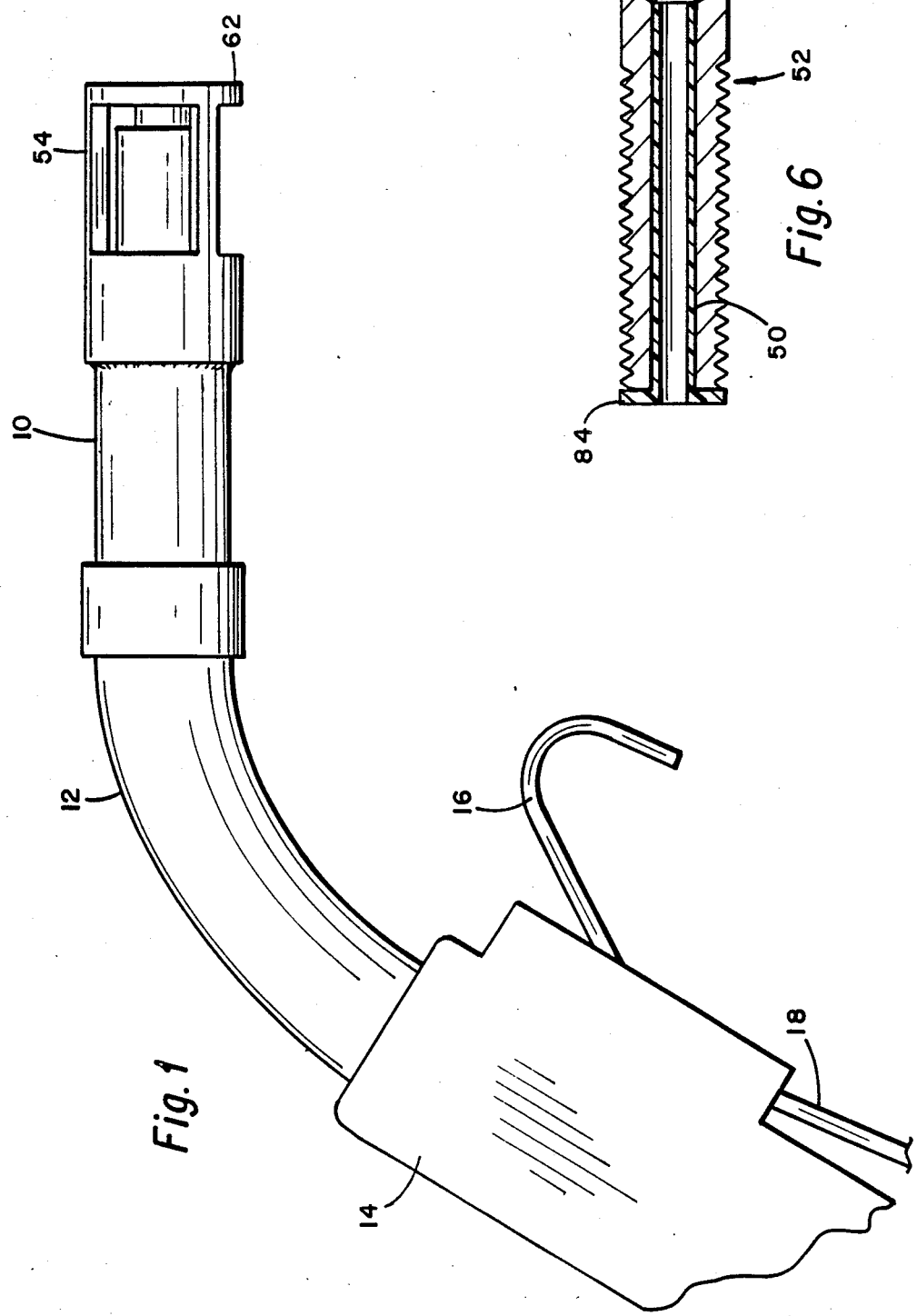
FIG. 1 is a side elevation of a modified mig welding nozzle of the present invention.

Referring to the drawings in detail, FIG. 1 shows a mig welding nozzle 10 which has been modified in a manner later to be described. The nozzle connects, in a conventional manner, with a hose 12 which is associated with a handle 14 having a hook 16 and a trigger 18 which can be actuated to initiated the wire feed, electrical current flow, and the flow of argon gas in a manner later to be described. The means for feeding the wire through the hose, the means for providing electrical voltage and the means for providing a flow of inert gas through the hose are essentially conventional and, therefore, are not described herein.

Referring now to FIG. 2, the nozzle 10 has an enlarged portion 20 in which is received a thin cylinder 22 of insulating material for the purpose of receiving the nozzle 10 on the end of the hose 12. The latter is provided with an extension 24 preferably made of copper. The extension is provided with three circumferential grooves (unnumbered) in which are received an O-ring 26 and two metal rings 28 and 30. When the left hand end of the nozzle 10 is attached to the hose, the insulating cylinder 22 will be received over the extension 24. The O-ring 26 and the metal rings 28 and 30 will hold the nozzle in place.

The nozzle 10 tapers down to a reduced cylindrical portion 32. The forward portion of the extension 24 is provided with a second extension 34, generally of square shape, and a third extension 36, generally of cylindrical shape. The right hand end of the extension 36 is provided with a threaded opening 38 which is adapted to receive the left hand threaded end of a contact tip guide 40. The contact tip guide 40 is provided with a longitudinal bore 42 through which the mig welding wire 44 can pass. Both extensions 24 and 34 are hollow and extension 34 is provided with four holes 46 (only one of which is shown) on each of the four sides of the extension. Thus, inert gas can pass through the hose 12, through the extensions 24 and 34 and through the holes 46 into the annular space between the right hand end 32 of the nozzle 10 and the contact tip guide 40.

To this point in the design, the elements described are conventionally used in the normal mig welding process except for the contact tip guide 40 described above. Normally, the contact tip guide is an elongated copper cylinder having an outer diameter essentially the same as the diameter of the threaded end shown in FIG. 2 and having a bore, such as bore 42 through the entire length of the guide. The threads (as shown to the left in FIG. 2) would normally be cut into the end of the guide. However, with respect to the present invention, the right hand end (extending from the right of the threaded portion) has a reduced external diameter 48 for a purpose which will hereinafter appear.

A stud 52, which is essentially the same as the stud 52 described in my copending application, Ser. No. number 07/251,333, is adapted to be received over the reduced portion 48 with an insulating layer 50 being disposed between the stud 52 and the narrow cylinder 48. A shroud 54, which can be made of brass, for example, is attached to the nozzle 10 by means of threads 56 which have been cut into the right hand end of the enlarged portion of the nozzle 10. The inner left hand end of the shroud is provided with threads 58 which mesh with the threads 56. When the shroud 54 is correctly located on the threaded portion of the nozzle, it can be welded in place by means of a weld 59. Alternatively, if the position of the shroud 54 can be determined in advance, the threads can be eliminated entirely, the shroud attached to the nozzle by the weld 59 alone. The tapered portion and reduced cylindrical portion 32 of the nozzle 10 extend towards the right hand end of the shroud 54 but terminate short thereof as shown in FIG. 2. The right hand end of the shroud 52 extends outwardly beyond the outer end of the reduced cylindrical portion 32, but still short of the forward surface of the ring 62. The left hand end 60 of the shroud is a continuous hollow cylindrical member. The right hand end 62 is a continuous ring which connects with the portion 60 by means of three longitudinal legs 64, 66 and 68. Thus, in the portion of the shroud 64 between the ring 62 and the cylindrical portion 60 there are three open spaces defined by the legs 64, 66 and 68.

The design of the stud 52, shown best in FIGS. 4 and 6, is important as far as the present invention is concerned. This stud 52 is provided with a forward unthreaded end 70 and a rear threaded portion 72. As will hereinafter appear, when the stud 52 is welded to the broken-off stud, a nut (not shown) can then be placed or threaded onto the threaded portion 72 to properly secure the exhaust pipe (not shown) to the manifold (not shown). From the left hand end of the stud 52 there is an internal bore 74 which extends to approximately the midportion of the unthreaded end 70. This bore 74 is slightly larger than the outer diameter of the insulating sleeve 50 which is received therein. Where the bore 74 meets the midpoint, internally, of the unthreaded portion 70, the bore flares out, as at 76, to a lager opening 78. The end of the stud is provided with a pair of slots 80 on opposite sides of the stud. These slots 80 are extremely important. It has been discovered, without the slots, that a welding arc can be quickly extinguished during the welding process. Slots 80 also provide a means whereby the gasses can escape during the welding process.

The insulating cylinder 50 can be inserted over the reduced portion 48 of the guide 40. However, a washer 82 of insulating material abutts the right hand shoulder of the threaded portion of the guide 40 to prevent metal-to-metal contact between the stud 52 and the guide 40 when the stud is slipped all the way onto the guide 40.

FIG. 6 shows a stud 52 which has the insulation cylinder 50 already mounted therein. In this regard, the insulation material can be prepositioned on the guide 40 with the insulating washer 82 prior to inserting the stud 52 over the insulating layer 50. Alternatively (as shown in FIG. 6) the insulating layer 50 can be prepositioned in the stud 52 itself. However, in the case of FIG. 6, the insulating layer 50 will be provided with a flared portion 84 in the form of a cylindrical flange which then obviates the need for the washer 82.

OPERATION

If one is desirous of welding a new stud, such as stud 52, to the end of a brokenoff stud, one would first slide a new stud 52 over the reduced cylindrical portion 48 of the contact tip guide 40. If the stud 52 is not provided with an insulating cylinder 50 having the flange 84, as shown in FIG. 6, then one must make certain that an insulating cylinder 50 with insulating washer 82 have already been placed on the reduced portion 48. At this point, the nozzle assembly consisting of the nozzle 10 and shroud 54 is slipped over the extension 24 on the hose 12. The insulating cylinder 22 is normally fitted inside the left hand end of the nozzle 10. When the nozzle 10 is snuggly fitted onto the extension 24, as shown in FIG. 2, the stud 52 will be concentrically disposed within the reduced cylindrical portion 32 of the nozzle 10 so that argon gas can pass through the annular area between these two elements. The welding operation is preferably divided into two cycles, all of which will be determined by circuitry (not shown) the design of which is well within the skill of those who design circuits for welding systems. The operator will now position the device so that the ring 62 of the shroud 54 is located concentrically over the end of a broken-off stud. If a portion of the ring 62 between two of the legs 64, 66 or 68 is cut out, visual alignment of the end of the new stud 52 with the broken-off stud may be improved.

The trigger 18 is now depressed and the circuitry (not shown) referred to above will impress a d.c. voltage of about 15 to 40, and preferably 25 volts, across the wire 44 and the manifold (not shown) where the broken-off stud (not shown) is located. Simultaneously, or preferably just before the voltage is applied, insert gas is passed through the hose 12 and through the annular area between the stud 52 and the reduced portion 32 of the nozzle 10 and into the area of the desired weld. At the same time that the voltage is applied, the wire 44 will be advanced into the area of the weld at a rate of about 300 inches per minute. The current flow will be from 100 to 125 amps. This first cycle will last for about 1.5 seconds. At the end of 1.5 seconds, the voltage will drop to about 12 to 16 volts d.c., but the wire speed and the current flow will remain essentially the same. After 2.5 seconds, following the initiation of the second cycle, everything will shut off. That is, the voltage, wire feed and inert gas flow will cease. The nozzle 10 can now be pulled away from the stud 52 and the right hand end of the latter will be welded to the end of the broken-off stud.

Whereas the present invention has been described in particular relation to the drawings attached hereto, it should be understood that other and further modifications, apart from those shown or suggested herein, may be made within the spirit and scope of this invention.

What is claimed is:

1. In a welding apparatus for welding a new stud on to the end of a broken-off stud which comprises a conventional mig welding hose through which inert gas can pass and through which a mig welding wire can be fed, the hose having a conventional extension at one end thereof for attachment of a mig welding nozzle thereto, the extension also having means for attachment of a longitudinally extending contact tip guide through which the welding wire passes, the nozzle having an enlarged cylindrical portion which is received over the extension of the hose, and a reduced cylindrical portion extending over and beyond the contact tip guide in concentric relation thereto, the mig welding hose having a means associated therewith for initiating the flow of inert gas through the hose and into the annular area between the contact tip guide and the reduced cylindrical portion of the nozzle, for supplying a d.c. welding voltage across the wire and the object to be welded and for feeding the wire through the hose and through the contact tip guide, the improvement which comprises a cylindrical portion on the contact tip guide extending from the point of connection of the guide to the hose extension to the other end of the guide being of reduced external diameter as compared to the conventional contact tip guide, an insulating sleeve received over the reduced external diameter portion of the guide, a new stud having a longitudinal bore extending from a rear end there of to a location adjacent a forward end thereof where the bore flares outwardly to a larger bore at the forward end of the stud, the stud being received over the insulating sleeve such that the rear end of the stud abutts adjacent an inner end of the guide, insulation being interposed between the rear end of the stud and the abutting portion of the guide, a shroud having an inner end for receiving the shroud on the enlarged portion of the nozzle, the shroud having an outer end including a ring which is attached to the inner end of the shroud by means of a plurality of longitudinally extending legs, the length of the shroud being such that the ring extends just beyond the outer end of the stud when the latter is fully received on the guide.

2. A welding apparatus as set forth in claim 1 wherein the enlarged cylindrical portion of the nozzle is provided with external threads and wherein the inner end of the shroud has an internal threaded opening for receiving the shroud on the threaded portion of the nozzle.

3. A welding apparatus as set forth in claim 1 wherein the inner end of the shroud is welded to the enlarged cylindrical portion of the nozzle.

4. A welding apparatus as set forth in claim 1 wherein the ring is provided with a gap between two adjacent longitudinally extending legs.

5. A welding apparatus as set forth in claim 1 wherein the stud is provided with a pair of opposite longitudinally extending slots on the forward end thereof.

6. A method of welding a new stud onto the end of a broken-off stud which comprises utilizing a conventional mig welding hose and nozzle having means for feeding mig welding wire through the hose and through a guide which is attached to one end of the hose and wherein the nozzle is provided with an enlarged cylindrical end fitting over the end of the hose and a forward cylindrical portion of reduced diameter disposed concentrically around the guide, which comprises the steps of providing a cylindrical extension of reduced external diameter on the guide from its point of connection to the hose, inserting an insulating sleeve over the reduced diameter portion on the guide, inserting a new stud over the insulating sleeve and all the way onto the reduced diameter portion of the guide in such manner that the insulating sleeve prevents metal-to-metal contact between the stud and the guide, the insulating sleeve being received in a longitudinal bore in the new stud, providing a second bore of larger diameter than the first mentioned bore at the forward end of the new stud, providing slots in opposite sides of the new stud in the area of the second bore, connecting a shroud to the enlarged portion of the nozzle, the shroud having an inner cylindrical portion received on the enlarged end of the nozzle and an outer ring portion connecting to its cylindrical portion by a plurality of spaced longitudinal legs, the forward end of the stud projecting out of the forward end of the reduced portion of the nozzle, but short of the forward end of the ring, placing the apparatus just described against an exhaust manifold with the outer end of the new stud in alignment with the end of the broken-off stud, initiating a flow of inert gas through the hose, through the nozzle and around the resulting annular space between the new stud and the reduced portion of the nozzle, immediately thereafter initiating a d.c. welding voltage of 15 to 40 volts across the welding wire and the manifold for a period of about 1.5 seconds, while simultaneously advancing the welding wire towards the end of the broken-off stud at a rate of about 300 inches per minute, maintaining the welding current in the range of 100 to 125 amps, reducing the voltage to about 12 to 16 volts d.c. at the end of 1.5 seconds while maintaining the wire feed and the current flow the same, and thereafter, shutting off the flow of inert gas, the welding voltage and the wire feed approximately 2.5 seconds after the voltage reduction and removing the nozzle from the now welded new stud.

* * * * *